March 15, 1938.  C. WILL ET AL  2,111,413
AUTOMATIC CONTROL SYSTEM AND DEVICE
Filed Sept. 8, 1934   2 Sheets-Sheet 1
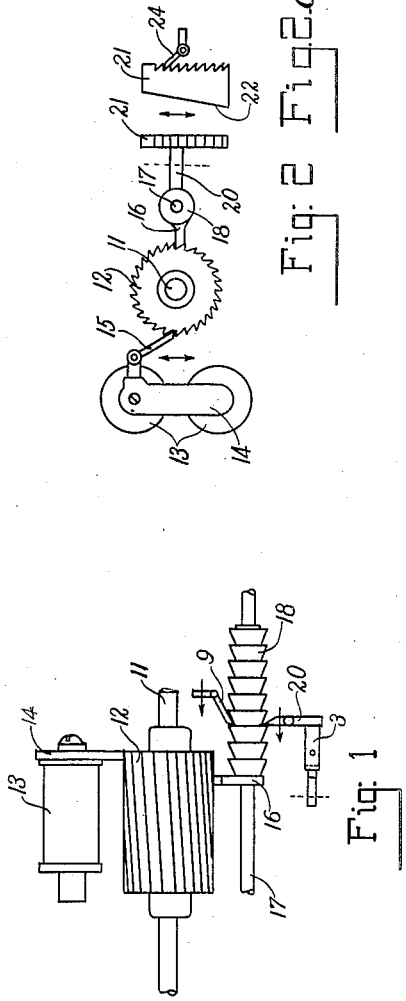
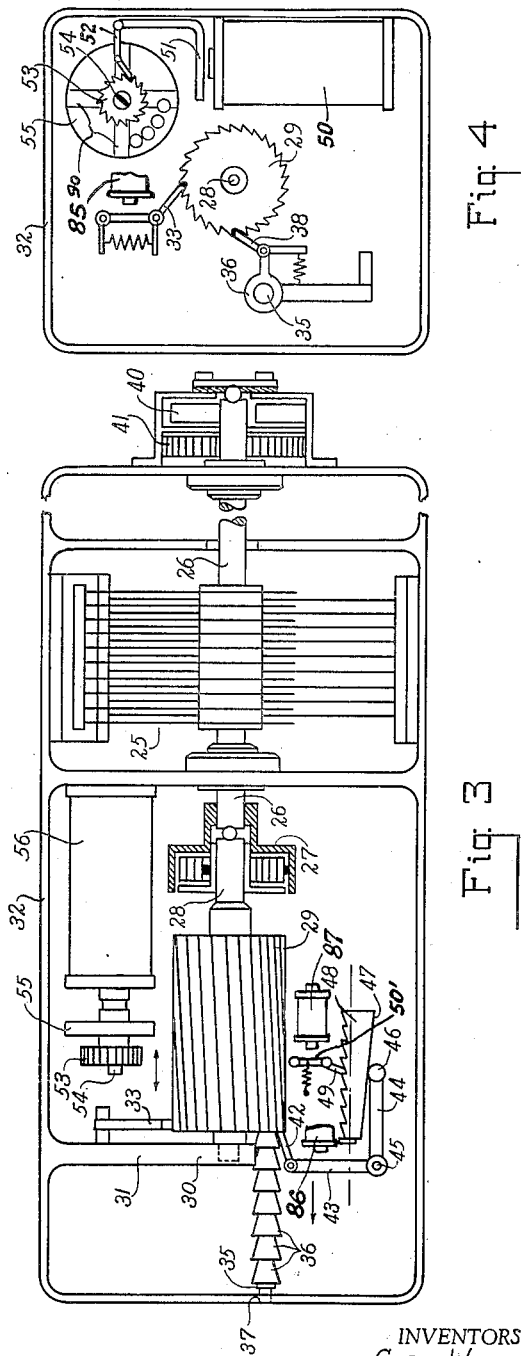
INVENTORS
CURT WILL
KARL BRAUN
BY George Ceier
ATTORNEY.

March 15, 1938.      C. WILL ET AL      2,111,413
AUTOMATIC CONTROL SYSTEM AND DEVICE
Filed Sept. 8, 1934      2 Sheets-Sheet 2
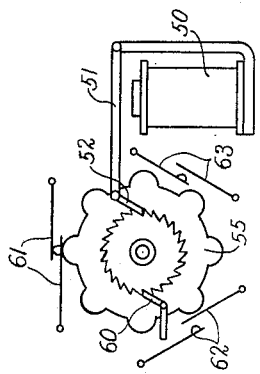
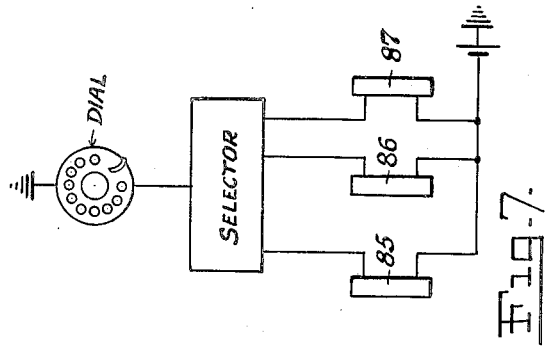
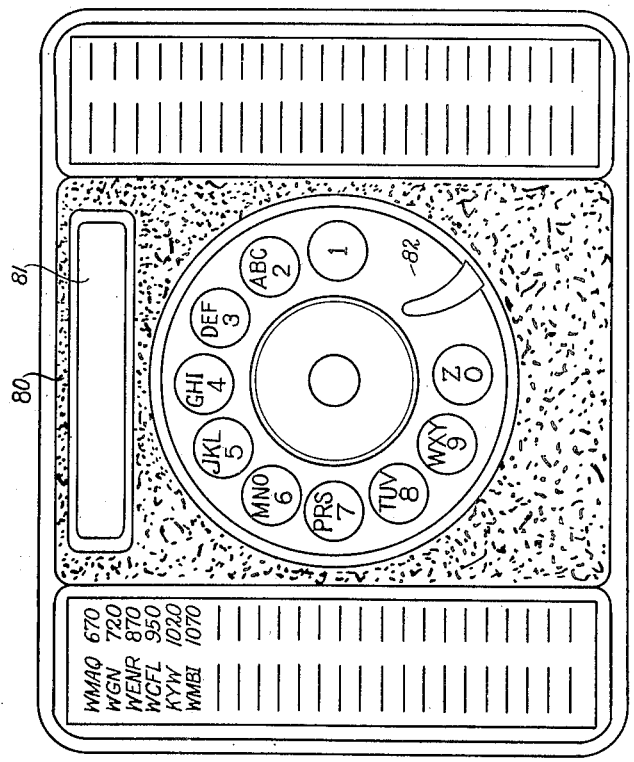
INVENTORS
CURT WILL
KARL BRAUN
BY George Auer
ATTORNEY.

Patented Mar. 15, 1938

2,111,413

UNITED STATES PATENT OFFICE 2,111,413

AUTOMATIC CONTROL SYSTEM AND DEVICE

Curt Will, Koenigsberg, and Karl Braun, Schneidemuhl, Germany

Application September 3, 1934, Serial No. 743,264
In Germany August 18, 1933

5 Claims. (Cl. 74—10)

Our invention relates to a novel and improved system and means for automatically controlling the adjustment or setting of electrical apparatus and is specifically concerned with the provision of means for controlling the operation and more particularly the tuning of radio receivers and the like.

The adjustment and selective operations of a radio receiver in addition to other manipulations require the operation of plate condensers so as to select the proper station for reception. This operation which is generally called "tuning" is not completely satisfactory inasmuch as it does not meet all conditions of operation. It is also rather inaccurate and cumbersome in spite of the well known provisions of indicators and the like. Attempts have been made to improve the tuning operation by remotely controlled means, for example, by motors coupled with the corresponding operating parts of the receiver by friction drives or like and subject to remote control by means of tuning switches or buttons connected with the receiver by a suitable cable. Prior suggestions of this character include the provision of cams and segments equipped with setting pins and/or notches for interlocking the operating parts in certain predetermined positions corresponding to predetermined stations or points of reception of the receiving set. The operating range of these prior systems and structures and their manipulative response are limited. They furnish the possibility of automatically selecting a limited number of predetermined stations which are in a sense preselected by the setting of the previously mentioned setting pins and/or cams or the like but do not provide for an invariably accurate selection of any station or point over the entire operating range of the set. Neither do they provide any means for automatic adjustment or selection of any one of a number of wave ranges within which the set may operate. Readjustments of a rather complicated nature are required if it is desired to set the apparatus for the automatic selection of other stations than those originally determined by the pre-selecting means.

Our invention proposes a novel method and means for overcoming the limitations and drawbacks of prior systems and structures of this character.

We employ a mechanism which consists of a switching member arranged in direct operative relation with the object to be controlled, for example, directly coupled with the condenser or condensers or other tuning elements of the receiving set, and actuate this member by impulse responsive means, for example, by electro-magnetic means responsive to impulses transmitted by a dial of a structure well known in signalling systems such as automatic telephone systems. The dial may be located at a distance from the receiving set. The combinations of separate and distinct numbers that may be dialed are for practical purposes unlimited. It is contemplated to assign to each of the various stations that may be selected with any given receiver distinct and separate numbers consisting of numerals or letters or combinations of numerals and letters. Upon dialing any specific predetermined number or designation which is in the nature of a code, impulses will be created and will actuate the apparatus in such a manner as to set the tuning members associated with the receiver accurately and swiftly to the desired point which corresponds to the station designated by the number or code combination dialed. The system is independent of space since the dial can be located at any desired point; it is also independent of the illumination at or in the vicinity of the receiver, and likewise independent of the manual skill of the operator beyond the ordinary skill required for operating the dial according to a predetermined sequence of numbers and/or letters. The system is also adapted and is, in fact, designed to cover the entire wave or frequency or reception range of any given receiver. An impulse responsive switching device may be employed for adjusting the receiver for reception within a predetermined wave range.

It will be understood, of course, that the invention in its broadest aspects is not strictly limited to radio receivers but may be employed in all such cases where certain control apparatus require accurate adjustment and/or remote control independent of local conditions or manual skill. Among the specific objects of the invention may be mentioned.

The provision of means directly coupled with a movable control member for setting or adjusting the member by the transmission of impulses to any position within its operating range.

The provision of an impulse controlled switch or selector having a rotatable toothed shaft and means to rotate the shaft step by step together with impulse controlled means for rotating the shaft intermediate of the steps so as to obtain a control over the space corresponding to the intervals between the first mentioned steps.

Another object of the invention may be stated to reside in the provision of apparatus for actuating a movable control member by impulse actuated means in such a manner as to obtain movement of the member in relatively coarse or large steps to advance the member into approximate relation to the ultimately desired position and in subsequently moving the member in successively smaller steps or divisions of steps or movements in accordance with the transmission of a predetermined sequence or succession of impulses.

A further object is concerned with a control apparatus including a movable member together with means in direct engagement therewith to move the same in a step-by-step manner and to impart further fractional motion to this member by the step-by-step-operation of means in indirect engagement with it.

Another object of the invention relates to the combination of a radio receiver with remotely controlled impulse responsive stepping means associated with the receiver for obtaining the accurate selection of a given operating range and the subsequent tuning within said range by the transmission of impulses or series of impulses representing or denoting predetermined points of reception of the receiver.

Still another object of the invention relates to a step-by-step-switching device or selector switch comprising a shaft having radially projecting peripheral teeth which are disposed in the longitudinal direction of the shaft at an angle to the axis thereof together with means engaging successive teeth for rotating the shaft by full steps and means engaging one single tooth for then fractionally rotating the shaft.

Other objects and features will appear from the description of the drawings in which Figs. 1, 2, and 2a illustrate the invention in a diagrammatic manner, the latter figure showing a side view of parts as seen from the right of Fig. 2;

Figs. 3 and 4 are somewhat diagrammatic views of the control apparatus with certain parts omitted and conveniently transposed so as to facilitate the description and the understanding;

Fig. 5 represents a modified impulse responsive switching means;

Fig. 6 illustrates the control member or dial and the mounting therefor; and

Fig. 7 is a schematic diagram of the electrical circuit connections.

Referring now to Figs. 1, 2, and 2a, which illustrate the principle of the invention in a diagrammatic manner, numeral 11 represents a shaft carrying a toothed barrel or member 12. The teeth are disposed on this barrel at an angle to the axis of the shaft. It may be remarked at this point that the shaft 11 may be suitably coupled with a corresponding object to be controlled, for example, with the tuning element or members of a receiving set. A stepping magnet 13 of suitable construction may be mounted as indicated at 14 and may be provided with an armature adapted to actuate a suitable pawl 15 (Fig. 2) so as to rotate the barrel 12 and with it the shaft 11 in a step-by-step manner responsive to impulses received by the magnet 13. The structural details are omitted in the drawings since the construction of such magnets and their armatures and pawls operated thereby are well known. A detent 16 which may be suitably mounted, for example on the shaft 17, may be arranged to engage the teeth on the barrel 12, conveniently shown in the drawing Fig. 2 opposite the operating pawl 15. The detent holds the barrel 12 in any position to which it is advanced by the magnet 13.

It will be seen that the structure described in the foregoing is adapted to advance or to rotate the shaft 11 step by step. Since the shaft is assumed to be coupled with suitable tuning means, it follows that this means can be set or adjusted to assume a number of definite positions each corresponding to the respective teeth on the barrel 12. Additional means are necessary for controlling the final setting or adjustment, in other words, the moving of the tuning means intermediate of the positions corresponding to the teeth on the barrel 12.

This latter means for fine adjustment comprises the detent 16 in combination with a stepping member 18 which, as illustrated, may also be provided on the shaft 17 holding the detent 16. A stepping magnet (not shown) is adapted to actuate pawl 9 so as to move the pawl, and, therefore, the member 18 along the shaft 17 in a step-by-step manner. A detent 20 cooperates with the member 18 so as to hold it in any position to which it is advanced by the actuation of the corresponding magnet operating the pawl 9. The detent 16 is associated with the stepping member 18 and, accordingly, it will be moved along the shaft 17 whenever an impulse is received to actuate the pawl 9. This detent 16 is in engagement with a tooth on the barrel 12, and, since the tooth is cut in the longitudinal direction of the barrel at an angle to the axis, it will be clear that the movement of the detent within and along the corresponding tooth will cause a further rotation of the barrel. This rotation will also be step-by-step but each step will cover only a fraction of the previous steps. The pitch or angle of the various teeth on the barrel will determine the relative rate of motion responsive to the actuation or shifting of the detent 16.

The motion or rotation of the tuning means which is coupled with the barrel 12, or, rather with the shaft 11, depends therefore, in the diagrammatic embodiment shown, first on the rotation of the tuning member primarily in accordance with the teeth of the barrel 12 responsive to the first set or series of impulses and, secondly, on the shifting of the detent 16 along the corresponding tooth or groove responsive to the second series of impulses. Accordingly, the radial angle of advancement or rotation of the tuning means is subdivided into fractions by the second series of impulses effective to the previously mentioned magnet and to the pawl 9. The units of motion will be progressively smaller. The impulses, of course, remain identical and uniform in every transmitted series. It is the motion of the detent 16 along the pitched grooves or teeth of the barrel 12 that causes the rotation in smaller steps or fractions of steps, and, accordingly, the setting of the tuning members at points located between the points corresponding to the teeth on the barrel 12. It will be realized, however, that since the motion is imparted to the control member by step-by-step means, the series of impulses effective to the member 18 and to the pawl 16 will advance the control or tuning member to a certain point within two given steps (on the barrel 12) and there will again remain a radial segment or area, however small, which may not yet be under complete control. Accurate tuning, however, requires absolute control of every point within the range of the tuning element or elements.

In order to take care of this control or fine adjustment, we have provided a toothed rack 21 shown in Fig. 2a having a face 22 cut at an angle and engaging a suitable lever system to be discussed later. A pawl 24 is adapted to engage the teeth on the rack 21. This pawl may be actuated by a suitable magnet (not shown) which is responsive to impulses so as to advance the rack 21. The angularly cut face 22 will thereby actuate the lever system and will move the detent 20 to advance the member 18 by fractions of movements of the teeth on this member so as to move the detent 16 along the corresponding tooth on the barrel 12 by increasingly smaller fractions of steps thereby advancing the tuning member to the finally desired position. The above structure, described for the purpose of illustrating the principle of the invention, involves an operating member (12) for moving the tuning means first in relatively coarse steps responsive to a first series of impulses, means (16—18—9—stepping magnet) responsive to a second series of impulses for moving the tuning means in successively smaller steps or fractions of the areas covered by each of the first series of steps, and means (20—21—lever system stepping magnet) responsive to a third series of impulses for moving the tuning means again, this time in yet smaller steps or fractions of the areas covered by each of the second series of steps. Each series of impulses may be dialed at a suitable device, well known in signalling systems such as automatic telephone systems, and each series of impulses will then correspond to a predetermined numeral or character designated on the dial. Thus, the three series or sets of impulses will simply represent a predetermined number or code and this code represents a predetermined station which is "tuned in" in the described manner. It may be mentioned at this point that separate switching or driving magnets may be provided if desired for actuating the various operating pawls to perform their corresponding functions. Relay means will then be required to direct the successive series of impulses to the proper magnets. Such switching relays are well known in the signalling art and particularly in telephone systems; they are shown and described, for example, in the book of Smith and Campbell, entitled "Automatic Telephony", published 1921 by McGraw-Hill Book Company, Inc. of New York. Numerous patents have also been issued showing relay means which perform the switching of series of impulses from one magnet to the other and also driving means for actuating operating elements of the class used in our invention. But of the many patents issued, we may mention the patent to Jacobsen, 1,580,490 of April 13, 1926 or the patent to Lomax, 1,674,652 of June 26, 1928. These references may be consulted for details concerning the switching functions and requirements as well as details relating to physical structure of relays and/or magnets. The system is not limited to the dialing of three series of impulses. The mechanism may be carried out further along the lines indicated to subdivide the motion of the tuning member or members in successively decreasing angles or areas of motion. It should be noted that every series of impulses is effective to the control and tuning member proper.

Each of the stepping members or ratchets is preferably provided with ten teeth so as to furnish the possibility of advancing by ten steps. Each step of a succeeding impulse series will then represent one tenth of a step of a preceding series.

The apparatus is shown somewhat more in detail in Figs. 3 and 4. However, it should be noted that these figures do not represent constructional drawings. The various parts and details are shown so as to facilitate the understanding rather than to show exactly the location which these details should receive in practice. Neither are the various parts shown in exact structural relationship or representing structural details because these may be had from known sources, e. g., from the publications referred to previously.

The tuning device proper which may be a plate condenser or a gang condenser or the like is indicated in Fig. 3 by the numeral 25. This condenser may be suitably coupled with other tuning means. The shaft 26 extends to the left and to the right of the condenser as shown and terminates in a coupling 27 which cooperates with the shaft 28. The latter carries the toothed control member 29. This member corresponds generally to the member 12 shown and described in conjunction with Figs. 1 and 2. The shaft 28 at its other end engages a suitable bearing at 30 which may be provided in the arm or projection 31 of the housing 32. A pawl 33 may be operated by a suitable magnet 85 (corresponding to magnet 13 of Figs. 1 and 2). A shaft 35 carrying the annular teeth 36 and detent 38 (Fig. 4) is suitably journaled in the housing 32 as shown at 37. The shaft 35 with the teeth 36 and the detent 38 may correspond to the shaft 17 carrying the teeth 18 and the detent 16 shown in Figs. 1 and 2. It will thus be seen that responsive to a first series of impulses effective to the corresponding driving magnet, e. g., magnet 56, the proper pawl will be actuated and will rotate the barrel 29 on the shaft 28 while the detent 38 will hold the barrel 29 and the shaft in any radial position. The shaft 28, upon being rotated in this manner, will rotate the shaft 26 due to the coupling device 27 and the condenser (e. g., the tuning means) will thus be rotated in a step-by-step manner to a desired primary or preliminary position. A suitable brake, which may be a hydraulically operated brake device of known and suitable construction may be provided at 40 so as to prevent any irregular motion which may be due to the inertia of the moved masses. It may be remarked at this point that adjacent to the hydraulic brake 40 may be disposed a release or return spring device 41 designed to restore the device into a zero position responsive to the proper release operation of the corresponding magnet or the like. Timing means may be provided if desired, for effecting the release after the lapse of predetermined periods.

The second series of impulses transmitted by the remotely located dial will be effective to the corresponding driving magnet 86 for actuating a suitable pawl 42 adapted to advance the control member carrying the teeth 36 to the right and to move thereby the detent 38 along the corresponding pitched tooth on the barrel 29. A suitable detent is provided to hold the operating member and the teeth 36 in any advanced position in the manner as described in conjunction with previously mentioned Figs. 1, 2, and 2a, with reference to the identical functions of the system. The tuning device 25 which may be coupled in the usual manner with other tuning elements will thus be moved in fractions of steps so as to advance closer to the desired position.

The pawl 42 is joined with a lever system, comprising the armature 43 and lever 44 which may be integral and pivotally mounted, as indicated at 45. The end 46 of the lever 44 may be equipped with a suitable roller or the like which is in engagement with the face 47 of the rack 48. This rack or ratchet corresponds to the rack 21 described in conjunction with Figs. 1, 2, and 2a. A pawl 49, which may be operable by an armature 50' of a suitable driving magnet 87 is adapted to engage the teeth on the rack 48 and to advance the rack with each impulse transmitted to the corresponding magnet. A suitable detent may cooperate with pawl 49 in a well known manner. The rack 48 is then advanced in response to a third series of impulses transmitted to the device, and the face 47 of rack 48 will actuate the lever system 44—43 so as to move the pawl 42 by fractions of steps in order to advance the operating member carrying the teeth 36 in conformance with these fractional steps. It should be noted that this pawl is now in engagement with one of the annular teeth 36. Accordingly, the barrel 29 and with it the tuning member or members will be advanced again, this time in smaller fractional steps than before. The term "fractional" is understood to refer in comparative sense to preceding steps. Thus, a step executed responsive to the second series of impulses covers only a fraction of a step executed responsive to the first series of impulses.

In most cases where our system is to be applied, three sets or series of impulses adapted to actuate three separate ratchets or the like, as described, in order to advance the tuning means in three successive intervals of operation with steps of decreasing size, will suffice for obtaining an accurate tuning within the entire range of the receiving set. However, as noted previously, and as will be clear from an inspection of the drawings and from the previously submitted remarks, our system can be amplified by the addition of stepping means and/or corresponding lever systems so as to produce an apparatus capable of receiving additional series of impulses, each effective to advance the tuning members by steps of successively decreasing size as described. The lever systems act in the nature of translating means permitting the use of uniform impulses to obtain varying results.

It will be seen from the above explanations that our system requires merely the dialing of a predetermined code number for automatically tuning a radio receiver accurately and swiftly to any receiving position within the range of the receiver.

The switching device comprising a magnet such as 50, shown in Figs. 4 and 5, which is operatively responsive to impulses transmitted by the dial and adapted to operate an armature 51 and thereby a pawl 52 which is adapted to rotate a toothed wheel 53 and thereby a shaft 54 carrying a disk or cam means or the like as designated by the numeral 55. The disk may be adapted to actuate contacts in the circuit of the requisite driving or switching magnets such as the magnet 56 (Fig. 3). Various switching operations may be controlled by the disk contacts, such as switching over from one series of impulses to another, and also the release operations.

It will be seen that the magnet 50 is adapted to actuate the armature 51 and thereby the pawl 52. The latter, responsive to the actuation of the magnet 50 particularly as shown in Fig. 5, advances the toothed wheel or ratchet 53. The detent 60 holds the toothed wheel in any position to which it is advanced. The disk 55 carries a number of suitable projections, as shown, for actuating contacts such as 61, 62, and 63. The magnet 50 may be actuated, for example, upon the forward movements of the dial, to rotate the disk 55 so as to actuate a predetermined one of the contacts 61—63, thereby effecting the corresponding switching circuits which set the apparatus for its subsequent functions. In the case of the arrangement shown in Fig. 4, the cross indicated in conjunction with the disk 55 will thus be rotated in order to actuate contacts in the same manner as the peripheral projections shown on the disk 55 in Fig. 5 are rotated to actuate contacts 61—63. Each contact is in a predetermined circuit and since these circuits are thus successively brought into action during the successive operations of the dial, it will be clear that it is in this manner possible to prepare successively such circuits as are required for obtaining the requisite successive operations of the magnets for actuating the pawls and ratchets which are provided for operating the toothed barrel or cylinder in steps and fractions of steps as described. The switching device shown in Fig. 5 may then be used for intermediate switching operations and also for the release of the device from any operating position to the position of rest as already described.

Fig. 6 of the drawings shows the dial for operating our system. This dial may be of standard construction as used in conjunction with automatic telephones and may be mounted on the face of a box-like or panel-like structure 80. The space 81 may be reserved to receive a suitable label and to the left and right of the dial 82 may be disposed designations denoting the various stations and the numerals or code numbers assigned to each of them. The spaces where the letters of the stations and the corresponding numbers are displayed may be suitably illuminated if desired. All the stations within the range of the receiver may thus be displayed on the face of the mounting panel 80 and any other stations may be dialed with ease and efficiently and the receiver will be promptly and accurately tuned to the desired position without the exercise of any skill and without any trouble whatever. An alteration of stations will not require any special setting of the apparatus.

Fig. 7 shows a schematic layout of the system, and indicates diagrammatically the electrical connections between the dial, the operating magnets, and the selector which is provided for distributing series of impulses to the magnets in sequential order. The dial is connected to the selector by a suitable line circuit, and the selector has individual circuits extending to each of the operating magnets. The selector, which may be of any well known type commonly used in automatic telephone systems, has the function of rendering the magnet circuits successively effective or receptive to impulses in predetermined order. Thus, the first series of impulses is directed to the magnet 85, the second series to the magnet 86, and the third series to the magnet 87. The magnets accordingly are operated successively by successive series of impulses to control the mechanism in the manner previously described.

We desire to have it distinctly understood that our invention is not limited either to the specific field of application nor to the specific structures shown. We have chosen a diagrammatic representation for the sake of convenience and in order to support the understanding rather than to show constructional details. The switching means and relays that may be used for realizing our system and our method of tuning are known and therefore require no specific representation or description. What we claim as our invention and desire to have protected by Letters Patent is defined in the claims which follow:—

1. A step by step operated device comprising, a shaft, teeth disposed on said shaft at an angle to the longitudinal axis thereof, impulse controlled means including a pawl for rotating said shaft by means of said teeth, a detent arranged to engage said teeth to govern the rotation thereof, and step by step controlled means for longitudinally moving said detent in any of said teeth to effect fractional rotary motion of said shaft.

2. A control apparatus comprising a step by step operated device, a control shaft for said device, teeth disposed on the periphery of said shaft and extending longitudinally thereto and at an angle to the axis thereof, impulse actuated means arranged to engage said teeth successively to rotate said shaft, and means arranged for longitudinal displacement within one of said teeth for rotating the shaft by fractions of a step, said fractional motion being governed by the angle of said steps to the axis of said shaft.

3. A wireless apparatus comprising tuning means, a control member cooperating with said tuning means, said control member consisting of a cylinder carrying peripheral longitudinal grooves cut at an angle to the axis thereof, means for transmitting a plurality of successive series of impulses to said apparatus, stepping means including a pawl engaging said cylinder and responsive to one series of said impulses for rotating said cylinder to adjust said tuning means in relatively large steps, a detent engaging said cylinder and a groove thereon, and stepping means responsive to successive series of impulses and including said detent for longitudinally moving said detent along said groove for rotating said cylinder to adjust said tuning means in successive steps of decreasing size.

4. A control device of the class described comprising a rotatable control cylinder carrying peripherally disposed longitudinal grooves which are inclined with respect to the axis thereof, impulse transmitting means, stepping means responsive to impulses transmitted by said impulse transmitting means and arranged to engage successive grooves on said cylinder for rotating the same step by step, a control member arranged to engage said grooves and to slide longitudinally within a groove, stepping means responsive to subsequently transmitted impulses for sliding said control member step by step along said groove to rotate said cylinder by fractions of said first steps, and control means actuated by said cylinder.

5. A control device of the class described comprising a rotatable control cylinder carrying peripherally disposed longitudinal grooves which are inclined with respect to the axis thereof, impulse transmitting means, stepping means responsive to impulses transmitted by said impulse transmitting means and arranged to engage successive grooves on said cylinder for rotating the same step by step, a control member arranged to engage said grooves and to slide longitudinally within a groove, stepping means responsive to subsequently transmitted impulses for sliding said control member step by step along said groove to rotate said cylinder by fractions of said first steps, means responsive to said impulse transmitting means for governing the actuation of said stepping means, and control means actuated by said cylinder.

CURT WILL.
KARL BRAUN.